June 24, 1930.  P. W. SHIELDS  1,768,158
METHOD AND APPARATUS FOR CARBONATING
Filed Oct. 20, 1923  7 Sheets-Sheet 1

June 24, 1930.  P. W. SHIELDS  1,768,158
METHOD AND APPARATUS FOR CARBONATING
Filed Oct. 20, 1923   7 Sheets-Sheet 3

INVENTOR
Patrick W. Shields,

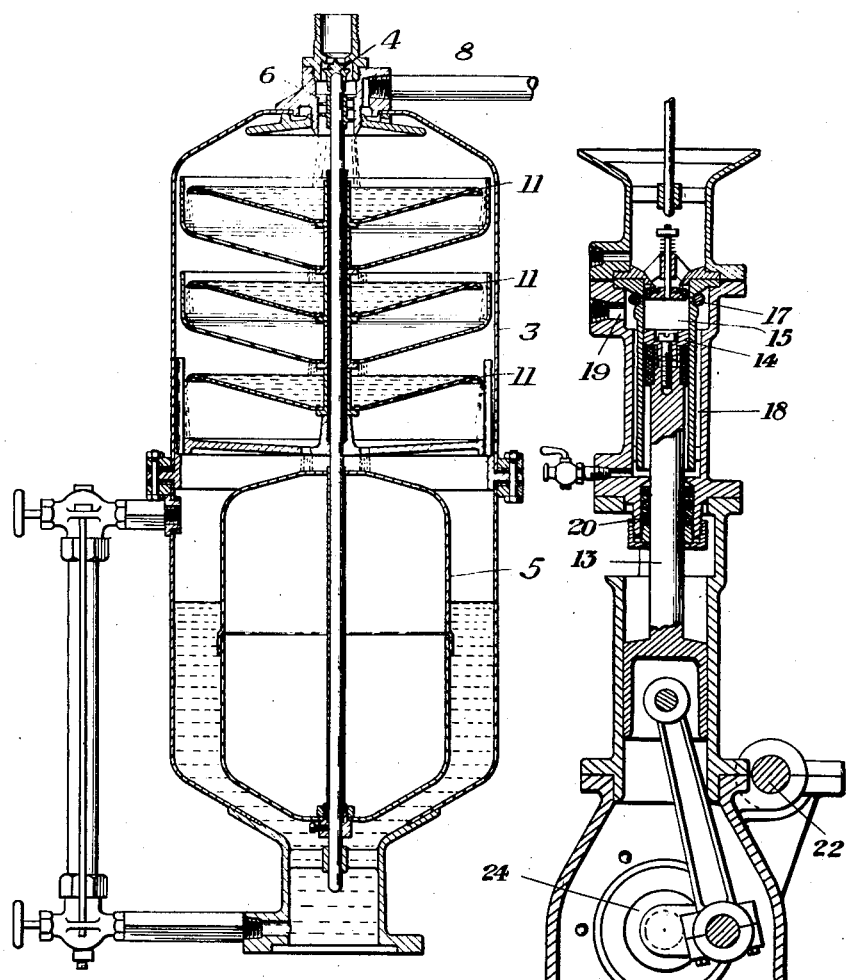

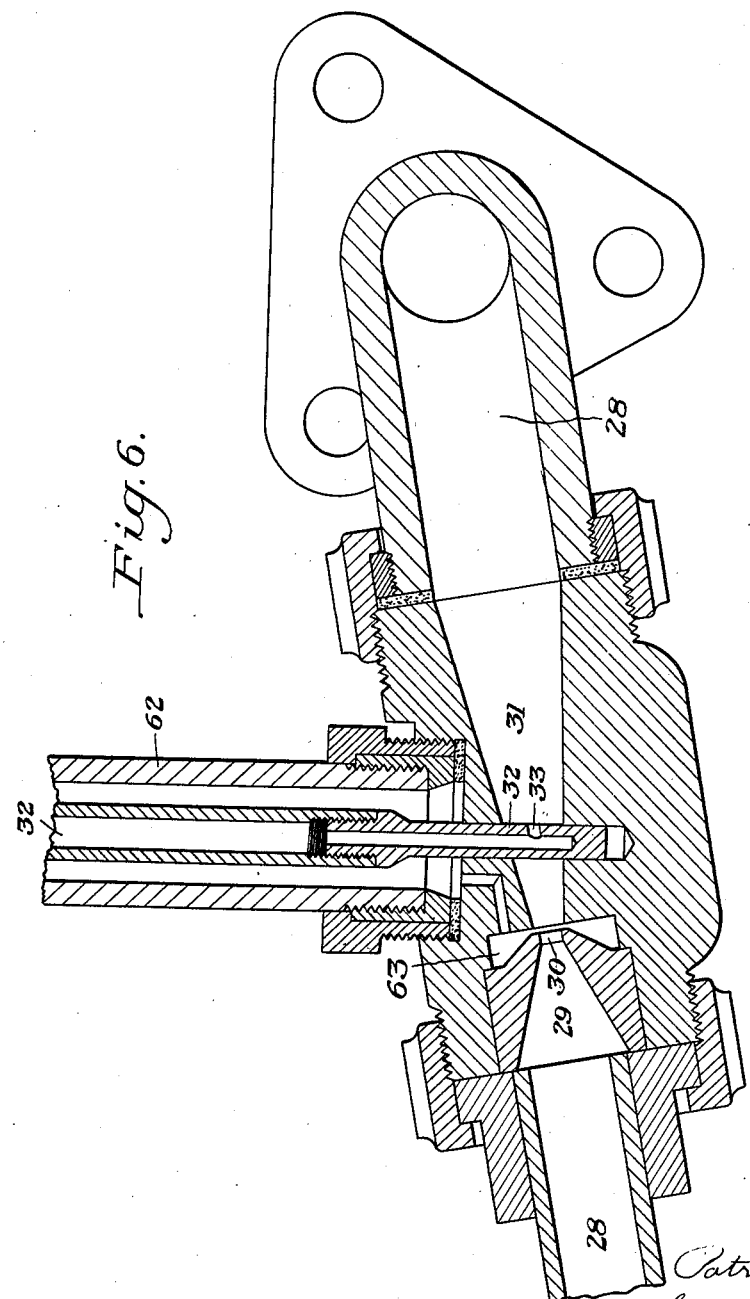

June 24, 1930.  P. W. SHIELDS  1,768,158
METHOD AND APPARATUS FOR CARBONATING
Filed Oct. 20, 1923  7 Sheets-Sheet 6
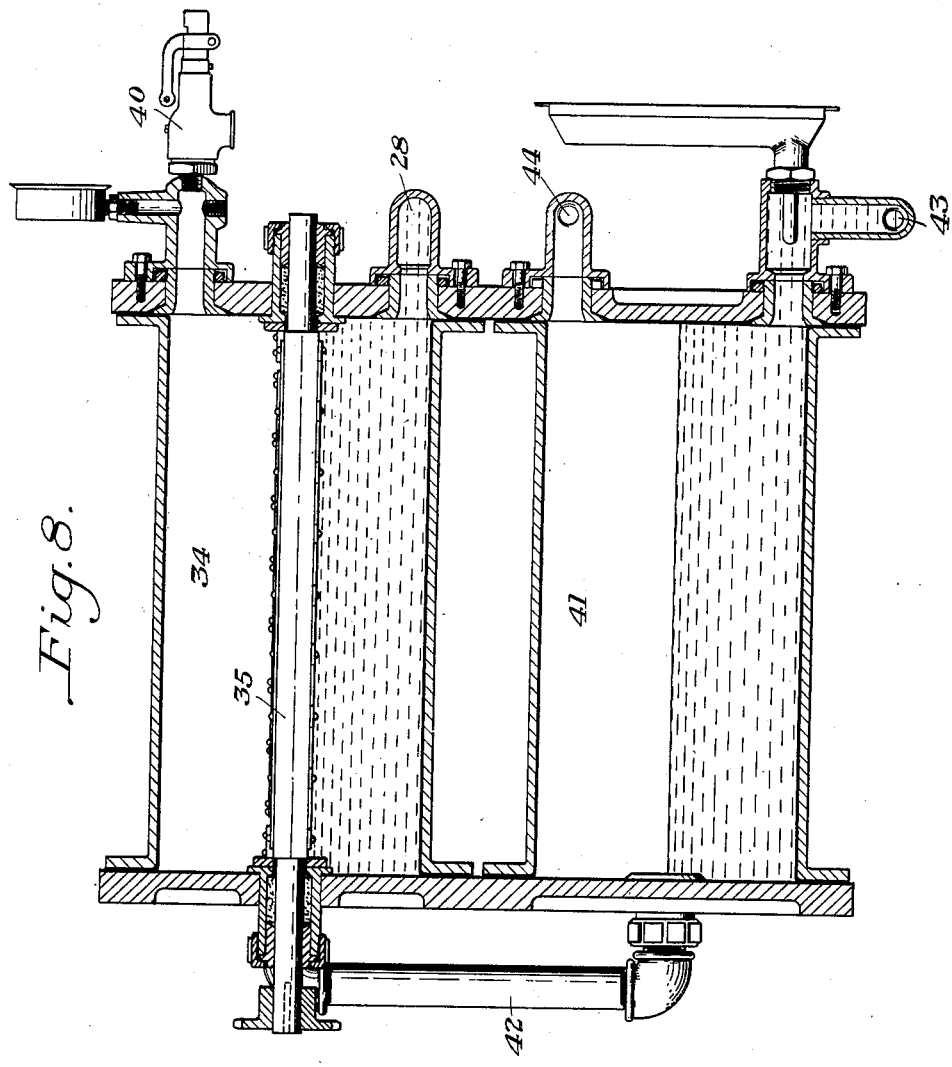
INVENTOR

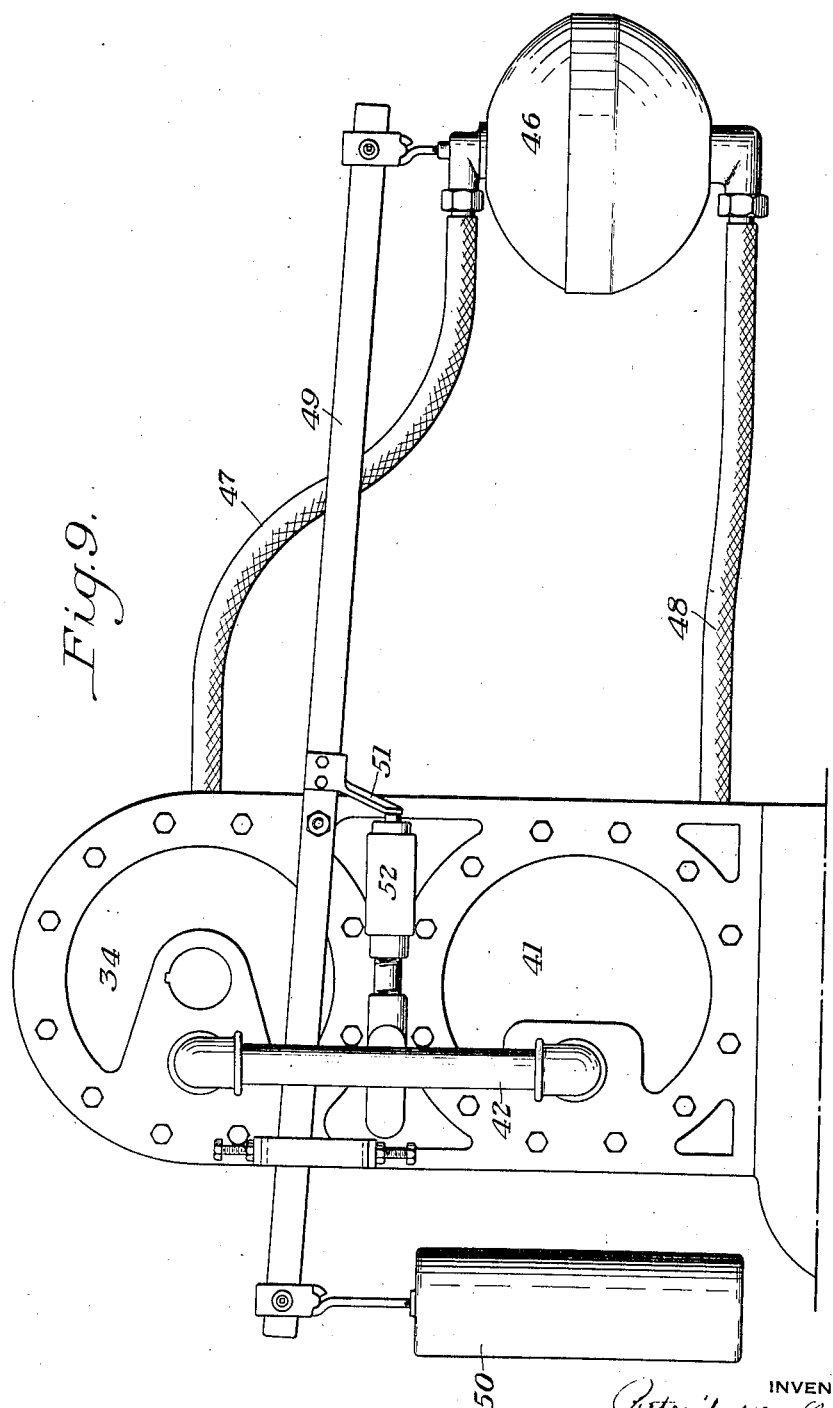

Patented June 24, 1930

1,768,158

UNITED STATES PATENT OFFICE

PATRICK W. SHIELDS, OF PITTSBURGH, PENNSYLVANIA

METHOD AND APPARATUS FOR CARBONATING

Application filed October 20, 1923. Serial No. 669,684.

This invention relates to method and apparatus for carbonating, and is directed toward a carbonator which will produce a high quality of carbonated water without any loss of carbon dioxide gas.

In the copending application of Shields and de Markus, Serial No. 585,657, filed September 1, 1922, there is set forth a carbonator in combination with deaerating means for treating the raw water and removing dissolved air therefrom before it enters the carbonator proper, with the attendant advantages of increased carbon dioxide gas absorption capacity of the water and a reduction in the possibility of aerobic growths in the bottled product.

It is necessary to interpose a pump between the deaerating chamber and the carbonating means in order to provide a suitable carbonating pressure, and I provide a pump wherein there is always an outward pressure on the stuffing box and wherein the suction valve is always submerged, thus effectively eliminating any possibility of air being drawn into the water as it passes to the carbonator.

I preferably divide the process of carbonation into a plurality of steps and vary the physical condition of the water at each step, having found that by so doing more efficient carbonation and better control thereof are attained. Moreover, I have found that it is desirable to provide a separate storage chamber for the carbonated liquid wherein it may be retained in a quiescent state until it is drawn to the bottling machine. This also insures better control of the carbonated water as it is delivered.

As one of the carbonating steps, I provide a gas supply having a nozzle for supplying carbon dioxide to the water and surround this nozzle by a moving stream of water, preferably at high velocity. Carbon dioxide is ordinarily supplied to a carbonator from drums in which it is contained at exceedingly high pressures. The gas pressure is reduced to carbonator pressure and this is generally accomplished by one or more reducing valves. However, the gas absorbs heat in large quantities during its expansion and there is a constant tendency for the valves to freeze up, making it necessary to provide heating coils and the like to insure continuous operation. By surrounding the expansion point of the gas with a stream of liquid to be carbonated, the nozzle is maintained at suitable temperatures, since the water is, relatively speaking, very warm, and continuous operation is thus obtained. Moreover, the temperature of the water is lowered because of its contact with the nozzle and this change in its physical condition increases its capacity for absorbing the gas. This step in the carbonation process is preferably carried out by providing a water conduit having a converging-diverging portion much on the order of a Venturi tube and admitting the gas adjacent the throat thereof. As the water passes through the throat of the tube, its pressure is lowered and its velocity increased, thereby materially assisting in maintaining the gas nozzle at suitable temperatures to prevent freezing.

The gas, if desired, may be supplied in excess of the capacity of the water to absorb the same under its then existing physical condition, and as it travels through the diverging portion of the water conduit, its pressure gradually increases, and with this increase in pressure the saturation point increases correspondingly. The water therefore will tend to absorb the gas in increasing amounts as it passes through the conduit.

I preferably direct the mixture of carbonated water and carbon dioxide into one end of an agitating chamber wherein there are provided paddles for driving the gas into combination with the water. The liquid level is preferably maintained in the chamber at such a height as to insure the paddles striking the liquid in a substantially horizontal manner, since I have found that this is conducive to best results. As a paddle strikes the water a certain amount of gas is trapped thereunder and is forced into the water, thereby giving it every opportunity to go into combination. Moreover, the paddles are driven at such velocity that as they are submerged in the liquid they leave an open space behind them, and as the water closes in, a considerable amount of gas is entrapped. I have found that it is possible to saturate water in a very marked degree in this manner.

It is desirable to maintain the carbonated water in a quiescent state, particularly if it is supersaturated and I therefore provide a separate storage chamber in which the liquid may be retained until it is drawn off for use. Carbon dioxide is, of course, present above the liquid in the storage chamber, and this, together with the absence of anything tending to disturb the carbonated liquid, tends to hold it up to whatever degree of saturation or supersaturation has been attained by the carbonating means. Moreover, the use of deaerated water insures a more stable product.

I provide for controlling the carbonating means in accordance with the liquid level in the storage chamber. This is preferably accomplished by a float which controls the pump motor, starting it when the liquid level drops in the storage chamber to a predetermined level and stopping it when the level has been raised a suitable amount. In this manner it is possible to run the carbonator at its most efficient speed regardless of the speed at which the bottling machine is operated.

It is desirable to maintain the carbonator pressure at a set figure within very small limits, and I accomplish this by providing a regulator in the gas line and providing a suitable static gas connection between the carbonator chambers and the regulator. The static line transmits the chamber pressure back to the regulator practically instantaneously and thus insures much closer regulation than could be attained if the gas supply line were depended on to transmit the pressure back to the regulator.

The static line is connected not only to the storage chamber, but also to the agitating chamber and serves to equalize the pressure therein. I provide for circulating the gas through the equalizing line by providing a connection from the regulator to the throat of the converging-diverging tube. This construction gives an aspirating effect whereby gas is drawn from the equalizing line through the regulator and into the rapidly moving water to secure precarbonation thereof.

In the accompanying drawings illustrating the preferred embodiment of the invention;

Figure 4 is a vertical section through the deaerating chamber;

Figure 5 is a vertical section through the carbonator pump;

Figure 6 is a vertical section through the water conduit showing the converging-diverging portion thereof, together with the gas inlets;

Figure 7 is a horizontal section through the agitating chamber;

Figure 8 is a vertical section through the agitating and storage chambers;

Figure 9 is a partial elevation showing the controlling means for the water pump.

Figure 1:
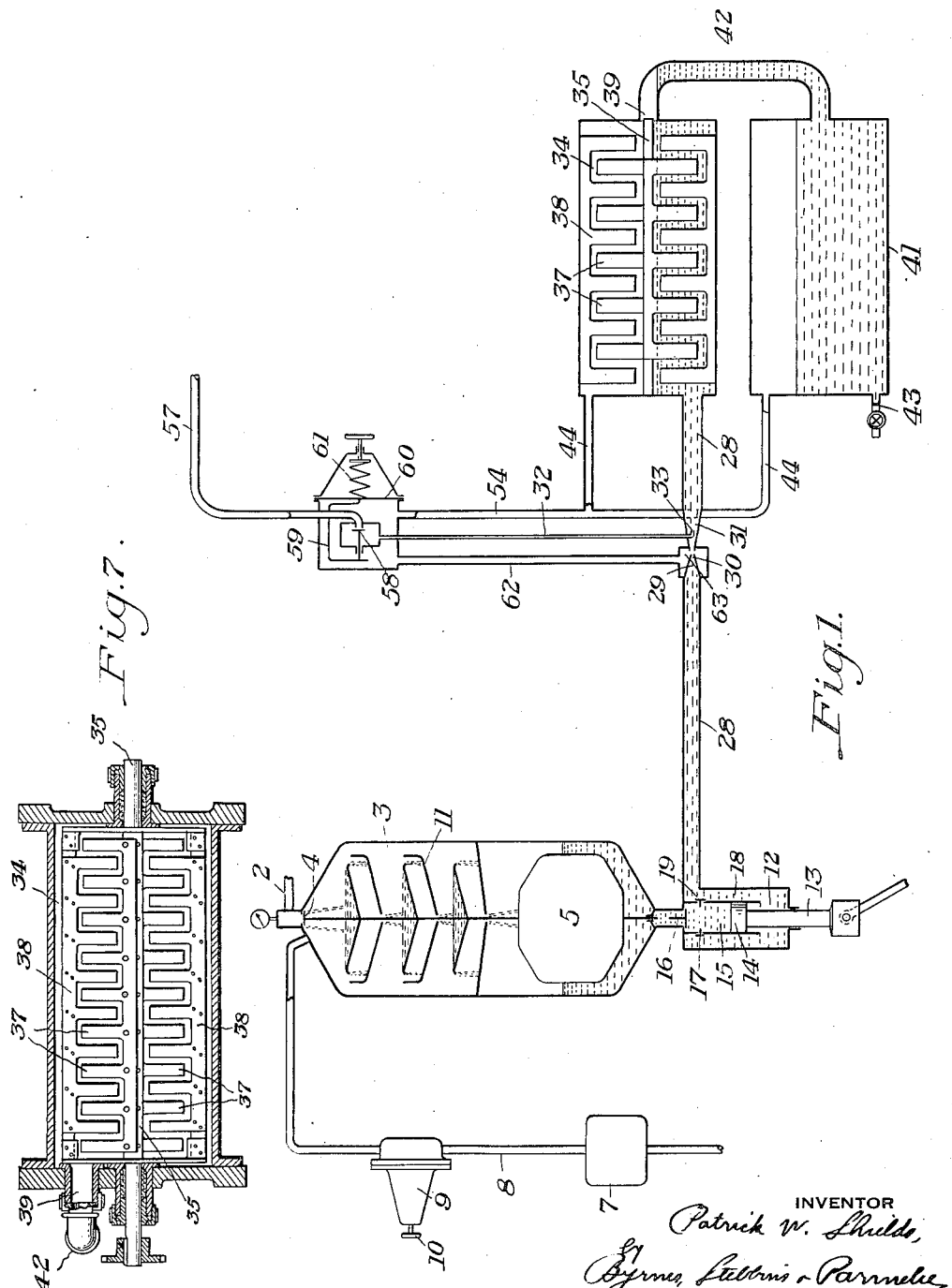
Figure 1 is a diagrammatic view illustrating the deaerating chamber, the water pump, the carbonating means and the gas control means.

In the illustrated embodiment of the invention, raw water enters the carbonator through a water connection 2 from which it passes into a deaerating chamber 3 through a valve 4 controlled by a float 5. After the water passes the valve 4, it is given a whirling motion by a helical guide 6 which serves to break it up into a spray as it enters the deaerating chamber 3. The pressure in the deaerating chamber is maintained very low by a vacuum pump 7 connected to the deaerating chamber by a conduit 8, in which is placed a spring loaded valve 9 having a regulating screw 10, by which the degree of vacuum which is to be maintained may be readily adjusted as desired. If the pump creates a lower pressure than is desired in the chamber 3, the valve 9 opens and admits air to the system.

The low pressure in the deaerating chamber is effective to deaerate the water and every opportunity is given the air to escape, this being accomplished by providing a series of cascade pans 11 over which the water passes on its way through the deaerating chamber. The water is maintained at a substantially constant level in the deaerating chamber and it will be observed from Figure 4 that a considerable depth is maintained This permits any entrapped air to escape by flotation and be taken off through the conduit 8.

The deaerated water passes from the chamber 3 to a water pump indicated generally by the reference character 12. The pump 12 is of the differential type and is provided with a piston rod 13 having an area of substantially one-half the area of the piston 14. Water enters the pump cylinder 15 on the down stroke of the pump through a spring closed valve 16 and on the up stroke is forced out of the cylinder 15 through a rubber ring valve 17. Passages 18 connect the rod end of the cylinder with the water space lying outside the valve 17 and the pump discharges through an opening 19. On the down stroke of the pump, water lying in the cylinder 15 and below the piston 14 is delivered as will be clearly understood, while fresh water is being drawn into the cylinder above the piston through the valve 16. On the up stroke, the valve 16 closes and the water is forced out through the ring valve 17. However, since the area of the piston rod 13 is half the area of the piston, substantially half the water discharged through the valve 17 is displaced by the piston rod and is forced out through the opening 19. It will thus be apparent that there is always an outward pressure on the pump stuffing box 20, thus making it impossible for air to enter the system at this point and insuring the delivery of properly deaerated water to the carbonator.

The pump is driven by a motor 21 which is connected to a counter-shaft 22 by a silent chain drive 23. The counter-shaft 22 is connected to the pump shaft 24 by a pair of gears 25. A second pair of gears 26 is also provided and the pinions of both pairs of gears 25 and 26 are made slidable on the counter-shaft 22 so that the speed of the pump may be varied by selecting one or the other of the gear trains, depending on the speed at which it is desired to operate the carbonator. The vacuum pump 7 is also driven from the counter-shaft 22 by gears 27.

The opening 19 is connected to a water conduit 28 having a converging section 29, a throat 30 and a diverging section 31 therein. As the water passes through the throat 30, its velocity is greatly increased and the high velocity water impinges on a gas supply tube 32 placed adjacent the throat 30. The tube 32 is provided with a gas nozzle 33 substantially co-axial with the water conduit and it will be apparent from Figure 6 that the nozzle in operation will be completely surrounded by a rapidly moving stream of water which serves to maintain the gas outlet at suitable temperature to prevent freezing thereof.

As the water passes through the diverging section 31 of the water conduit, its pressure and consequently its gas absorption capacity steadily increases. I preferably provide gas in excess amount through the gas nozzle 33 and the water tends to absorb more and more gas as it passes through the conduit and its pressure increases.

From the diverging section 31 of the water conduit the mixture of gas and carbonated water is led into an agitating chamber 34. This chamber is provided with a substantially horizontal shaft 35 connected to the counter-shaft 22 by a chain drive 36 and having a plurality of spaced apart paddles 37 thereon, between which are interposed stationary baffles 38. The liquid in the agitating chamber is maintained at a level substantially coincident with the axis of the shaft 35 by placing its outlet 39 at a suitable height, and it will be seen that the chamber will be half filled with carbonated water having carbon dioxide gas thereabove. As the shaft rotates, the paddles 37 drive the gas into the water and insure complete carbonation. The baffles 38 also serve to break up the water and materially aid in fixing the gas in solution. A relief valve 40 is provided for safety purposes and prevents building up of too great a pressure in the carbonator.

Immediately below the agitating chamber 34 is a storage chamber 41 connected thereto by a conduit 42. The mixture of gas and carbonated water enters the agitating chamber 34 at one end thereof through the conduit 28, travels the length of the chamber 34 and thence passes into the storage chamber 41, as best viewed in Figure 8. This insures that all the water will be subjected to the action of the paddles and properly carbonated before it passes into the storage chamber, from which it is drawn off as desired through a connection 43.

The separate storage chamber is of value in that it maintains the saturated or supersaturated liquid in a quiescent state and thus reduces gassing to a minimum. Moreover, it permits of the carbonator being operated at the most efficient speed regardless of the operation of the bottling machine (not shown), which is connected to the outlet 43.

Figure 2:
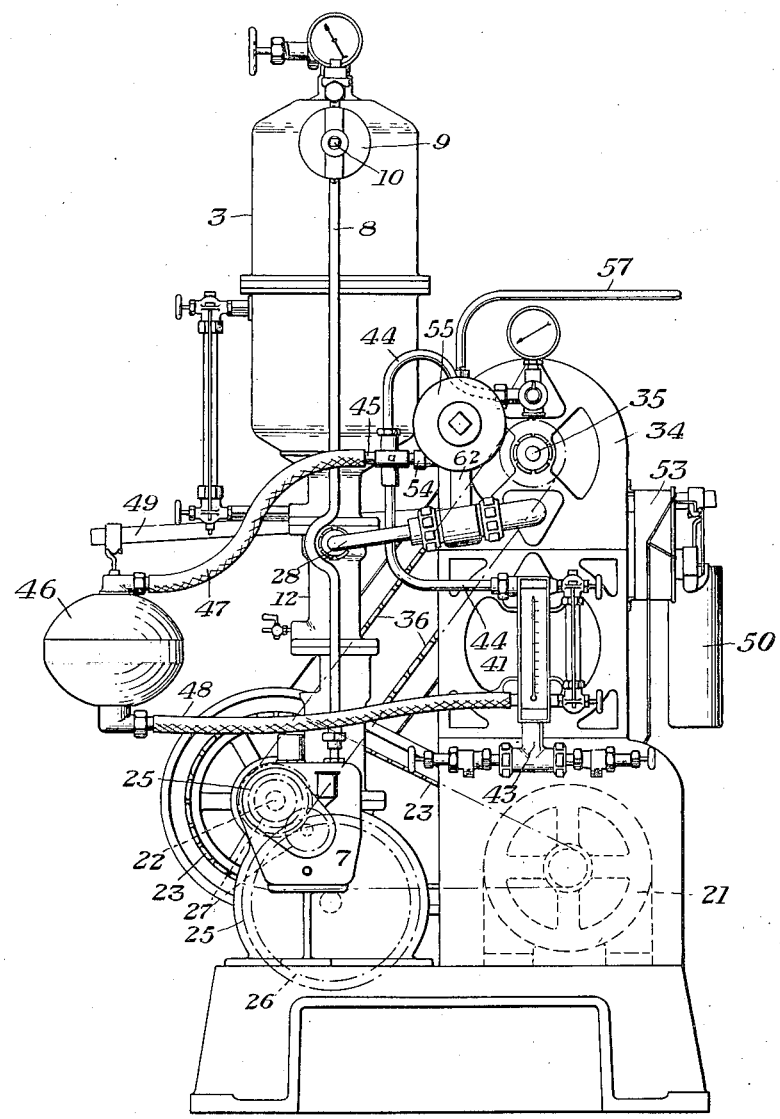
Figure 2 is an end elevation of a carbonator constructed in accordance with the diagram showing of Figure 1.
Figure 10:
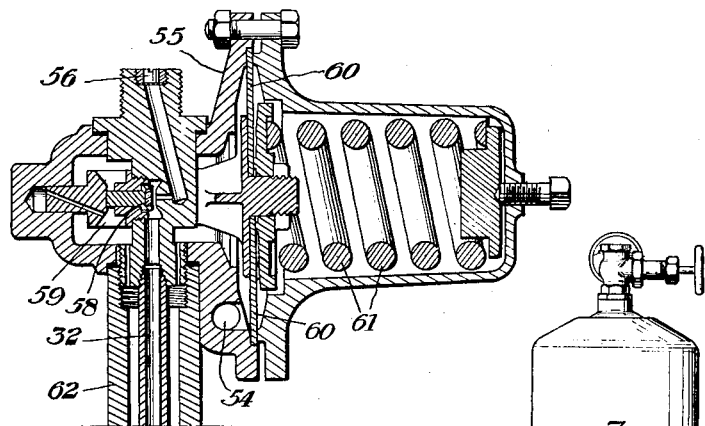
Figure 10 is a vertical section through the regulator employed.
Figure 3:
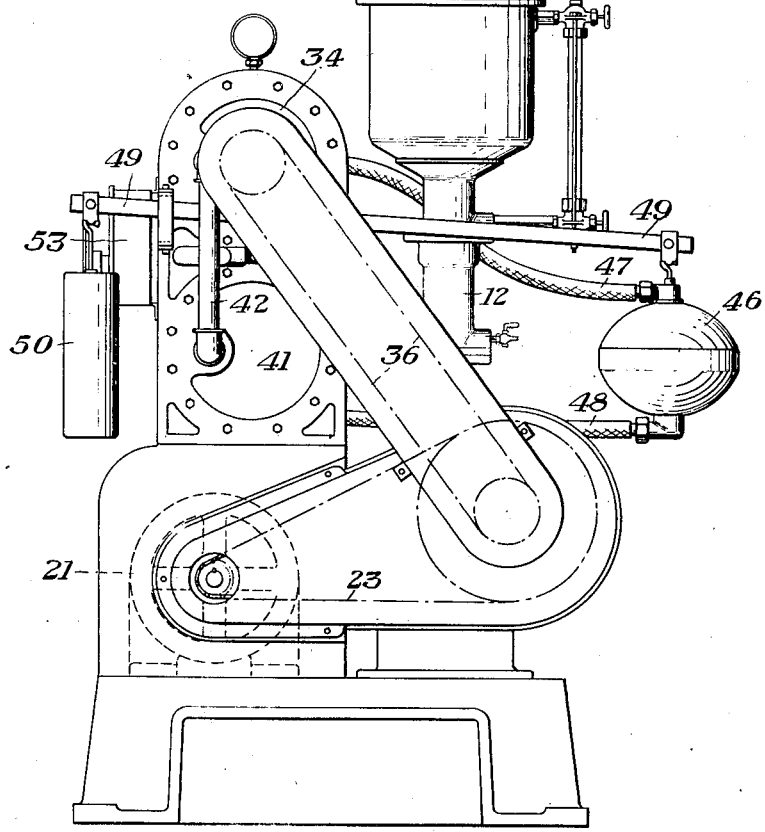
Figure 3 is an elevation of the other end of the carbonator of Figure 2.

The agitating chamber 34 and the storage chamber 41 are connected by an equalizing line 44 for making possible gas flow to or from either of the chambers. A branch 45 in the equalizing line 44 communicates the carbonator pressure to a container 46 through a flexible connection 47, while a flexible connection 48 maintains the same water level in the container 46 and in the storage chamber 41. The container 46 is carried on the end of a controlling arm 49 provided with a counter-weight 50 and a finger 51 which actuates a switch 52. If the water level in the storage chamber is lowered, the water level in the container 46 is correspondingly lowered and the counter-weight 50 raises the arm 49 and actuates the switch 52 to start the motor 20 and put the carbonator into operation. The operation continues until the level in the storage chamber is again raised, at which time the added weight of the water in the container 46 over-balances the counter-weight 50 and opens the switch 52 to stop the motor 21. A relay switch 53 may be provided, if desired, as shown in Figure 2.

The equalizing line 44 is also provided with a branch 54 which leads into the body of a gas regulator 55. This regulator is provided with a gas inlet 56 adapted to be connected to a gas supply line 57 leading from a gas tank or other source of supply. It will be understood that a regulator may be interposed between the gas tank and the regulator 55 if desired, but at least a portion of the pressure reduction is accomplished in the carbonator as above set forth to prevent freezing, without the provision of heating coils or the like. The gas inlet 56 is connected with the gas conduit 32 through a valve 58, actuated by a yoke 59 connected to a diaphragm 60 and a regulating spring 61. The gas pressure which is communicated to the diaphragm 60 through the branch line 54 from the storage and agitating chambers serves to vary the position of the valve 58 in such manner as to maintain the carbonator pressure within a very small range. This is highly desirable in apparatus of this character where uniformity of product is of considerable importance.

The gas which comes to the regulator from the storage and agitating chambers is taken off through a conduit 62 surrounding the conduit 32 and terminating in an annulus 63 surrounding the throat 30 of the water conduit 28. On account of the reduced pressure at the throat and also due to the aspirating action of the stream of water delivered therefrom, circulation is set up through the pipe 44, the branch 54, the regulator 55 and the conduit 62. The gas is also introduced to the water and serves to precarbonate the same, as will be apparent from Figure 6. Moreover, the relatively warm gas in the conduit 62 serves further to prevent freezing of the gas in the conduit 32.

It will be understood that while the gas connection between the chambers and the regulator has been termed a static line, this term is relative only, since while a certain amount of gas does actually flow therethrough, it is slight in comparison with the larger amount which is supplied through the conduit 32. It thus serves to control the regulator within far closer limits than by attempting regulation by communication of back pressure through the principal gas conduit 32.

I provide a carbonator having means for expanding the gas and means for surrounding the expansion point with the water, thereby eliminating the possibility of freezing and utilizing the property of high absorption capacity at low temperature to increase the efficiency of the carbonator.

I further provide for supplying carbon dioxide to the water and changing the physical condition thereof to insure complete carbonation. The gas which is carried into the agitating chamber in combined form is thoroughly mixed with the water, the bubbles being broken up, thus giving the gas every opportunity to go into solution.

I further provide for separately storing the carbonated water in a quiescent state and also provide means for reclaiming the excess gas which is present in the storage and agitating chambers. This feature is of particular value when the gas is utilized by leading it back to a region wherein low pressure is set up by the moving water.

The provision of means for deaerating the water is of great value, particularly in connection with the storage chamber and the differential pump, since tests have shown that water maintains its carbonation over a much longer period where it has been so treated, whether it is under pressure or not.

As clearly apparent from Figure 2, the gas regulator 55 is positioned quite close to the venturi like passage, whereby a comparatively short and almost negligible length of gas conduit 32 is present between the regulator and expansion nozzle 33. Freezing in this conduit is prevented by the surrounding envelope of relatively warmer fluid. In operation, this fluid is gas from the storage and agitating chambers, while with the apparatus shut down it may be partly water at the level of the water in the agitating chamber.

While I have illustrated one embodiment of my invention, it will be understood that it is not limited thereto, but may be otherwise embodied within the scope of the following claims.

I claim:

1. The method of impregnating a liquid with a gas, which includes degasifying the liquid and thereafter maintaining it substantially out of contact with any gas other than the gas with which it is to be impregnated, expanding the gas, and utilizing the lowered temperature thereof to cool the liquid, whereby the saturation point of the liquid is raised.

2. The method of impregnating a liquid with a gas, which includes degasifying the liquid and thereafter maintaining it substantially out of contact with any gas other than the gas with which it is to be impregnated, supplying gas at a pressure higher than the liquid pressure, expanding the gas at the point of introduction of the liquid and varying the liquid pressure.

3. A carbonator, including a container for carbonated water, a gas conduit having an outlet in communication with the container, a regulator in the gas conduit, and a separate connection between the regulator and the container for actuating the regulator in accordance with conditions in the container.

4. A carbonator, including a container for carbonated water, a gas conduit leading to the container and having a restricted orifice therein, a pressure responsive regulator in the gas conduit, and a separate connection between the regulator and the container for actuating the regulator in accordance with pressure conditions in the container.

5. A carbonator, including a container for carbonated water, a gas supply conduit leading to the container, a pressure responsive regulator in the gas conduit, and a static pressure connection between the regulator and the container.

6. A carbonator, including degasifying means for the water to be carbonated, carbonating means, a water connection between said means, means for increasing the water pressure between the degasifying means and the carbonating means, and means for maintaining an outward pressure throughout the connection.

7. A carbonator, including degasifying means for the water to be carbonated, carbonating means, and a differential pump for supplying water to the carbonating means from the degasifying means.

8. A carbonator, including a water conduit having a portion terminating in an opening of reduced size and having a portion of increasing diameter extending from said opening, and a throat portion fitting in the first mentioned portion and provided with an opening substantially as large as the conduit but terminating in an opening adjacent to and of the same general size as the reduced size opening first mentioned, the nozzle portion being spaced away from the first mentioned reduced size opening to provide an annulus, and means for supplying gas to said annulus.

9. A carbonator, including a water conduit having a portion terminating in an opening of reduced size and having a portion of increasing diameter extending from said opening, and a throat portion fitting in the first mentioned portion and provided with an opening substantially as large as the conduit but terminating in an opening adjacent to and of the same general size as the reduced size opening first mentioned, the nozzle portion being spaced away from the first mentioned reduced size opening to provide an annulus, means for supplying gas to said annulus, and a gas conduit terminating in the diverging portion and adapted to supply gas to water passing therethrough.

10. A carbonator including a water conduit, means for forcing water therethrough, the conduit having a portion which increases in cross sectional area along its length in the direction of the flow of water therethrough, and means for introducing gas into said portion at points of different cross sectional area.

11. In a carbonator, a water conduit, means for forcing water therethrough, the conduit having a portion which first decreases in cross sectional area and then increases in cross sectional area, and means for introducing gas to said portion at a plurality of points of different cross sectional area.

12. In a carbonator, a water conduit, means for forcing water therethrough, the conduit having a portion which first decreases in cross sectional area and then increases in cross sectional area, and means for introducing gas to the conduit at a plurality of points of successively greater cross sectional area.

13. In a carbonator, a water conduit, means for forcing water therethrough, the conduit having a portion which first decreases in cross sectional area and then increases in cross sectional area, and means for introducing gas to the conduit at a plurality of points of successively greater cross sectional area, the first point of introduction being substantially at the point of minimum cross sectional area.

In testimony whereof I have hereunto set my hand.

PATRICK W. SHIELDS.